(12) United States Patent
Lehman et al.

(10) Patent No.: US 10,526,532 B2
(45) Date of Patent: *Jan. 7, 2020

(54) COMPOSITIONS AND METHODS FOR IMPROVING PROPPANT CONDUCTIVITY

(71) Applicant: CARBO CERAMICS INC., Houston, TX (US)

(72) Inventors: Lyle Lehman, Katy, TX (US); Chad Cannan, Lancaster, NY (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,191

(22) Filed: Jul. 30, 2018

(65) Prior Publication Data

US 2018/0334615 A1  Nov. 22, 2018

Related U.S. Application Data

(62) Division of application No. 14/982,284, filed on Dec. 29, 2015, now Pat. No. 10,035,950.

(60) Provisional application No. 62/097,181, filed on Dec. 29, 2014.

(51) Int. Cl.
C09K 8/80 (2006.01)
C09K 8/68 (2006.01)

(52) U.S. Cl.
CPC .............. *C09K 8/805* (2013.01); *C09K 8/68* (2013.01); *C09K 8/80* (2013.01)

(58) Field of Classification Search
None
See application file for complete search history.

(56) References Cited

U.S. PATENT DOCUMENTS

| | | | |
|---|---|---|---|
| 6,818,594 B1 * | 11/2004 | Freeman | C09K 8/536 166/300 |
| 9,951,267 B2 * | 4/2018 | Duenckel | C09K 8/805 |
| 2005/0006095 A1 * | 1/2005 | Justus | C09K 8/516 166/295 |
| 2006/0124302 A1 | 6/2006 | Gupta et al. | |
| 2007/0202318 A1 | 8/2007 | Smith et al. | |
| 2008/0135245 A1 | 6/2008 | Smith et al. | |
| 2011/0117067 A1 * | 5/2011 | Esteghlalian | C09K 8/035 424/93.21 |

OTHER PUBLICATIONS

Non-Final Office Action dated Oct. 20, 2017 for U.S. Appl. No. 14/982,284.

* cited by examiner

*Primary Examiner* — John J Figueroa
(74) *Attorney, Agent, or Firm* — Patterson + Sheridan, LLP

(57) ABSTRACT

Compositions and methods for improving proppant conductivity are disclosed herein. The compositions can include a proppant composition for use in hydraulic fracturing, the composition containing a plurality of particulates. At least one particulate of the plurality of particulates can contain at least one nutrient. The at least one nutrient can separate from the at least one particulate located inside a fracture of a subterranean formation after a period of time.

10 Claims, 2 Drawing Sheets

US 10,526,532 B2

COMPOSITIONS AND METHODS FOR IMPROVING PROPPANT CONDUCTIVITY

CROSS-REFERENCE TO RELATED APPLICATIONS

This application is a United States Divisional patent application claiming priority to U.S. Non-Provisional patent application Ser. No. 14/982,284, filed Dec. 29, 2015, which claims benefit to U.S. Provisional Patent Application Ser. No. 62/097,181, filed Dec. 29, 2014. Each of the aforementioned applications is herein incorporated by reference.

TECHNICAL FIELD

The present invention relates to methods for hydraulically fracturing an oil or gas well to improve the production rates and estimated ultimate recovery (EUR) with proppant containing a nutrient.

BACKGROUND

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the oil or gas is held in a formation having insufficient permeability for economic recovery of the oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

In the course of production, oil and gas wells oftentimes exhibit buildup of barium sulfate scale and/or organic material, such as paraffin deposits, that can reduce well production and ultimately reduce EUR. In methods referred to as enhanced oil recovery (EOR), many types of chemical treatment agents have been injected into wells to prevent the buildup of scale and paraffin deposits. One type of EOR includes the downhole delivery of microorganism derived surfactants to achieve increased production. This type of EOR is known as microbially enhanced oil recovery (MEOR). However, these microorganisms may not survive or thrive under downhole conditions, limiting their ability to provide surfactant material to the formation and borehole region. Also, these microorganisms injected downhole may be lost or returned to the surface once production commences.

Therefore, what is needed is a way to provide resilient microorganisms that can survive and remain downhole in order to provide long term surfactant properties.

BRIEF DESCRIPTION OF THE DRAWINGS

The present invention may best be understood by referring to the following description and accompanying drawings that are used to illustrate embodiments of the invention. In the drawings.

DETAILED DESCRIPTION

Figure 1:
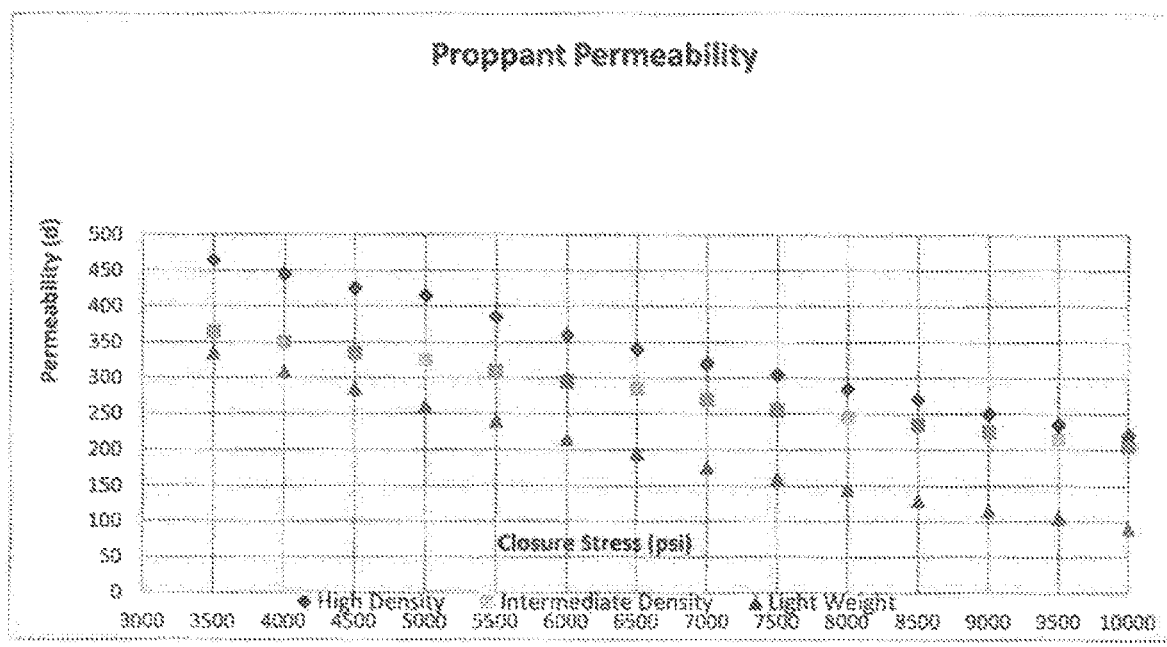
FIG. 1 is a graphical representation of a comparison of proppant permeability for lightweight ceramic proppant, intermediate density ceramic proppant, and high density ceramic proppant.

In the following description, numerous specific details are set forth. However, it is understood that embodiments of the invention may be practiced without these specific details. In other instances, well-known structures and techniques have not been shown or described in detail in order not to obscure the understanding of this description. Additionally, as used herein, the term "exemplary" is intended to mean serving as an illustration or example, and is not intended to indicate a preference.

The term "apparent specific gravity," as used herein, is the weight per unit volume (grams per cubic centimeter) of the particles, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples. Additionally, as used herein, the term "exemplary" is intended to mean serving as an illustration or example, and is not intended to indicate a preference.

The term "conductivity," as used herein, is defined as the product of the width of the created fracture and the permeability of the proppant that remains in the fracture.

The term "high density proppant," as used herein, means a proppant having an apparent specific gravity of greater than 3.4 g/cm$^3$.

The term "intermediate density proppant," as used herein, means a proppant having an apparent specific gravity of from about 3.1 to 3.4 g/cm$^3$.

The term "internal interconnected porosity," as used herein, is defined as a percentage of the pore volume, or void volume space, over the total volume of a porous ceramic particulate.

The term "light weight proppant," as used herein, means a proppant having an apparent specific gravity of less than 3.0 g/cm$^3$.

The term "ceramic," as used herein, means any non-metallic, inorganic solid material.

The term "synthetic ceramic proppant," as used herein, means any man-made or synthetic ceramic particulate(s).

The term "proppant," as used herein, means material that includes one or more (e.g., tens, hundreds, thousands, millions, or more) of individual proppant particles, particulates or elements.

The term "native microorganisms," as used herein, means microorganisms naturally occurring in a subterranean formation.

The term "foreign microorganisms," as used herein, means microorganisms not naturally occurring in a subterranean formation.

The term "nutrient," as used herein, means elements, compounds, and/or compositions for supporting propagation and/or colonization of a microorganism.

The term "infuse," as used herein, means to inject, attach, introduce, or otherwise include a material into a porous substrate, such as a porous ceramic.

The term "degradable," as used herein, means the ability of a chemical or coating to react to dissolve or breakdown into smaller components under one or more downhole conditions.

According to certain exemplary embodiments of the present invention, a proppant particulate containing one or more nutrients is disclosed. The proppant particulate can be porous or non-porous. The one or more nutrients can be disposed on, attached to, coated on, absorbed into, infused into, or otherwise combined with the proppant particulate to produce the proppant containing one or more nutrients, also referred to as a nutrient containing proppant particulate. The nutrient containing proppant particulate can be synthetic and/or naturally occurring. For example, the nutrient containing proppant particulate can include sand, plastic beads, glass beads, walnut hulls, ceramic proppant, porous synthetic ceramic proppant, and non-porous synthetic ceramic proppant. The nutrient containing proppant particulate can also be coated with a resin and/or epoxy material. In an embodiment, the coating can include or otherwise contain the nutrient. The nutrient containing proppant particulate can also be uncoated.

Also according to certain exemplary embodiments of the present invention, a proppant composition for use in hydraulic fracturing is disclosed. The composite proppant composition can include at least one proppant particulate containing a nutrient. In an embodiment, at least a portion of the proppant composition can include a porous ceramic particulate containing a nutrient. Also, according to certain embodiments of the present invention, the proppant composition can include a non-porous proppant portion and a porous proppant portion, wherein at least a portion of the porous proppant contains the nutrient. Furthermore, according to certain embodiments of the present invention, the permeability and conductivity of the composite proppant composition is at least equal to the permeability and conductivity of the non-porous proppant part alone. The porous ceramic proppant has an internal porosity, or percent (%) porosity. The internal porosity of the porous ceramic proppant can be infused with the nutrient so that the porous ceramic proppant acts as a carrier for the nutrient in a hydraulic fracturing operation. By tailoring the type of porous ceramic proppant used as a carrier, any potential impact to proppant conductivity by using the porous ceramic proppant can be avoided.

The nutrient can be used to support propagation and/or colonization of any suitable native microorganism. For example, the nutrient can be a food source for any suitable native microorganisms. The native microorganisms can be or include any one or more of bacteria, fungi, algae, archaea, and protozoa. The native microorganisms can alter or change the surface-active properties of the subterranean environment, the one or more fractures, and/or proppant disposed within the one or more fractures in any suitable manner. For example, the native microorganisms can produce or secrete chemicals that can alter the wettability and fluid affinity of the subterranean environment, the one or more fractures, and/or proppant disposed within the one or more fractures. The native microorganisms can also produce chemicals that can remove gel and/or thickening agents from the proppant pack and the formation. The native microorganisms can also produce chemicals that can inhibit scale formation, paraffin formation, and/or asphaltene formation in the one or more fractures. In one or more embodiments, the nutrients can be selected to increase the amount of hydrophobic surfactants, hydrophilic surfactants, scale inhibiting chemicals, paraffin inhibiting chemicals, and/or asphaltene inhibiting chemicals present within the fractures.

The nutrient can also be used to support propagation and/or colonization of any suitable foreign microorganism. The foreign microorganisms can be or include one or more of bacteria, fungi, algae, archaea, or protozoa or the like. In one or more embodiments, the foreign bacteria can be or include one or more of classes of facultative anaerobes, obligate anaerobes, denitrifiers, or *clostridium* or the like. The foreign bacteria can be or include one or more of *acinetobacter, arthrobacter, corynebacteria, achromobacteria, acrobacter, enterobacteria, nocardia, vibrio, shewanella, thauera, petrotoga, microbulbifer, marinobacteria, fusibacteria, rhodotorula, calcoaceticus, Pseudomonas, Pseudomonas aeruginosa, Pseudomonas fluorescens, Bacillus, Bacillus acidocaldarius, Thermos thermophiles*, or *Thermos aquaticus* or the like. In one or more embodiments, the foreign fungi can be or include one or more of *actinomycetes, saccharomycetes, schizosaccharomyces*, oyster mushrooms, *pleurotus*, wood-decay fungi, or white-rot fungi or the like.

The nutrient can be or include any one or more of proteins, carbohydrates, or lipids. The proteins can be or include any suitable monomers of amino acids. Suitable amino acids include, but are not limited to, phenylalanine, valine, threonine, tryptophan, methionine, leucine, isoleucine, lysine, histidine, arginine, cysteine, glycine, glutamine, proline, tyrosine, alanine, aspartic acid, asparagine, glutamic acid, or serine or the like. The carbohydrates can be or include any one or more of monosaccharides, disaccharides, oligosaccharides, or polysaccharides. In one or more embodiments, the carbohydrates can be or include sugar, glucose, sucrose, fructose, glyceraldehyde, starch, glycogen, cellulose, chitin, lactose, guar, guar gum, molasses, or xanthan gum or the like. The carbohydrates can be selected from products of a Maillard Reaction of one or more starch molecules. For example, carbohydrates can be or include dextrin. The lipids can be or include any one or more of glycolipids, lipopeptides, phospholipids, fatty acids, neutral lipids, vitamin A, vitamin D, vitamin E, vitamin K, monoglycerides, diglycerides, or triglycerides or the like.

The nutrient can also be or include any suitable inorganic elements and/or compounds. For example, the nutrient can be or include inorganic compounds containing elements selected from the group of carbon, hydrogen, oxygen, phosphorus, nitrogen, sulfur, manganese, iron, potassium, and calcium and any combination thereof. The phosphorous containing compounds can be or include monocalcium phosphate, dicalcium phosphate, or phosphoric acid or the like. The nitrogen containing compounds can be or include ammonium chloride, nitrates such as potassium nitrate and ammonium nitrate, urea, or nitratine or the like.

In one or more embodiments, the nutrient can be or include any material suitable for increasing a population of oil soluble native microorganisms. The oil soluble microorganisms can assist in the removal of or inhibit the formation of scale, paraffin deposits, wax, and/or asphaltenes from a proppant pack located in the subterranean formation.

According to several exemplary embodiments, the proppant composition includes a plurality of any suitable proppant particulates. Suitable proppant particulates can be any one or more of lightweight ceramic proppant, intermediate strength proppant, high strength ceramic proppant, natural frac sand, porous ceramic proppant, glass beads, natural proppant such as walnut hulls, and any other man-made, natural, ceramic or glass proppant. According to several exemplary embodiments, the proppant particulates include silica and/or alumina in any suitable amounts. According to several exemplary embodiments, the proppant particulates include less than 80 wt %, less than 60 wt %, less than 40 wt %, less than 30 wt %, less than 20 wt %, less than 10 wt %, or less than 5 wt % silica based on the total weight of the proppant particulates. According to several exemplary embodiments, the proppant particulates include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant particulates include at least about 30 wt %, at least about 50 wt %, at least about 60 wt %, at least about 70 wt %, at least about 80 wt %, at least about 90 wt %, or at least about 95 wt % alumina based on the total weight of the proppant particulates. According to several exemplary embodiments, the proppant particulates include from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the proppant composition includes proppant particulates that are substantially round and spherical having a size in a range between about 6 and 270 U.S. Mesh. For example, the size of the particulates can be expressed as a grain fineness number (GFN) in a range of from about 15 to about 300, or from about 30 to about 110, or from about 40 to about 70. According to such examples, a sample of sintered particulates can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

According to several exemplary embodiments, the proppant composition includes proppant particulates having any suitable size. For example, the proppant particulates can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the proppant particulates have a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the proppant particulates have a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the proppant composition includes proppant particulates having any suitable shape. The proppant particulates can be substantially round, cylindrical, square, rectangular, elliptical, oval, egg-shaped, or pill-shaped. For example, the proppant particulates can be substantially round and spherical. According to several exemplary embodiments, the proppant particulates of the proppant composition have an apparent specific gravity of less than 3.1 g/cm$^3$, less than 3.0 g/cm$^3$, less than 2.8 g/cm$^3$, less than 2.5 g/cm$^3$, less than 2.2 g/cm$^3$, or less than 1.9 g/cm$^3$. According to several exemplary embodiments, the proppant particulates have an apparent specific gravity of from, about 1.6 to about 4.5 g/cm$^3$, about 1.8 to about 2.6 g/cm$^3$, about 2.3 to about 3.2 g/cm$^3$, or about 3.1 to 3.4 g/cm$^3$. According to several exemplary embodiments, the proppant particulates have an apparent specific gravity of greater than 3.4 g/cm$^3$, greater than 3.6 g/cm$^3$, greater than 4.0 g/cm$^3$, or greater than 4.5 g/cm$^3$.

According to several exemplary embodiments, the proppant composition includes porous proppant particulates having any suitable porosity. The porous proppant particulates can include an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, or about 45% or more. In several exemplary embodiments, the internal interconnected porosity of the porous ceramic proppant is from about 5 to about 35%, about 5 to about 15%, or about 15 to about 35%. According to several exemplary embodiments, the proppant composition includes porous proppant particulates having any suitable average pore size. The porous proppant particulates can have an average pore size that is at least larger than the size of the nutrient component in its largest dimension.

According to several exemplary embodiments, the proppant composition includes porous and/or non-porous proppant particulates having any suitable permeability and conductivity in accordance with ISO 13503-5: "Procedures for Measuring the Long-term Conductivity of Proppants," and expressed in terms of Darcy units, or Darcies (D). The nutrient containing proppant particulates can have a long term permeability at 7,500 psi of at least about 1 D, at least about 2 D, at least about 5 D, at least about 10 D, at least about 20 D, at least about 40 D, at least about 80 D, at least about 120 D, or at least about 150 D. The nutrient containing proppant particulates can have a long term permeability at 12,000 psi of at least about 1 D, at least about 2 D, at least about 3 D, at least about 4 D, at least about 5 D, at least about 10 D, at least about 25 D, or at least about 50 D. The nutrient containing proppant particulates can have a long term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, the nutrient containing proppant particulates can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

According to certain embodiments described herein, the sintered, substantially round and spherical particulates are made in a continuous process, while in other embodiments; the particulates are made in a batch process.

Ceramic proppant can be manufactured to a range of apparent specific gravity. For example, U.S. Pat. No. 4,427,068, the entire disclosure of which is incorporated herein by reference, discloses a method for manufacturing proppant with an apparent specific gravity of less than 3.4 g/cm$^3$. The method includes preparing proppant pellets from a clay mixture of at least 40% clay, and another material such as bauxite or alumina. The clay mixture includes burley clay, flint clay and at least 60% diaspore clay. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.7 and 3.4 g/cm$^3$.

Also, U.S. Pat. No. 4,440,866, the entire disclosure of which is incorporated herein by reference, discloses a method for continuous process manufacture of proppant with an apparent specific gravity of approximately 3.7 g/cm³. The method includes 1) preparing an aqueous feed suspension of bauxite and a binder, 2) continuously atomizing the feed suspension into a layer of already partly dried bauxite particulates fluidized in a stream of drying air, 3) continuously recovering particulates from the layer, 4) continuously separating the particulates into oversize, undersize, and product fractions, 5) continuously recycling unsuitable material, and 6) drying and sintering the non-recycled product by heating at a temperature of between about 1200 and 1650° C.

In addition, U.S. Pat. No. 4,522,731, the entire disclosure of which is incorporated herein by reference, refers to the method disclosed in U.S. Pat. No. 4,440,866 to manufacture proppant having an apparent specific gravity of less than 3.0 g/cm³.

Moreover, U.S. Pat. No. 4,623,630, the entire disclosure of which is incorporated herein by reference, discloses a method for manufacturing proppant with an apparent specific gravity of between about 2.6 to 3.3 g/cm³. The method includes preparing proppant pellets from a mixture of dried but uncalcined or partially calcined clays and bauxites and dust collector fines with fully calcined materials. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.6 and 3.3 g/cm³.

Further, U.S. Pat. No. 4,658,899, the entire disclosure of which is incorporated herein by reference, discloses a method for manufacturing proppant with an apparent specific gravity of between about 2.9 and 3.2 g/cm³. The method includes preparing proppant pellets from a mixture of 40-70% dried but uncalcined clay, and bauxites and dust collector fines with fully calcined materials. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.9 to 3.2 g/cm³.

Still further, U.S. Pat. No. 7,036,591, the entire disclosure of which is incorporated herein by reference, discloses that ceramic proppant can be manufactured to a range of apparent specific gravity. The range of apparent specific gravities reflects the range of internal porosity present in the ceramic pellets. According to certain embodiments of the present invention, the proppant composition has an apparent specific gravity of less than 3.1 g/cm³, less than 3.0 g/cm³, less than 2.8 g/cm³, or less than 2.5 g/cm³. In other embodiments, the proppant composition has an apparent specific gravity of from about 3.1 to 3.4 g/cm³. In still other embodiments, the proppant composition has an apparent specific gravity of greater than 3.4 g/cm³, greater than 3.6 g/cm³, greater than 4.0 g/cm³, or greater than 4.5 g/cm³.

According to several exemplary embodiments, the proppant composition includes a porous ceramic proppant. According to several exemplary embodiments, the proppant composition can also include a non-porous proppant. Suitable materials for use as the non-porous particulate include lightweight non-porous ceramic proppant, intermediate density non-porous ceramic proppant and high density non-porous ceramic proppant.

Figure 2:
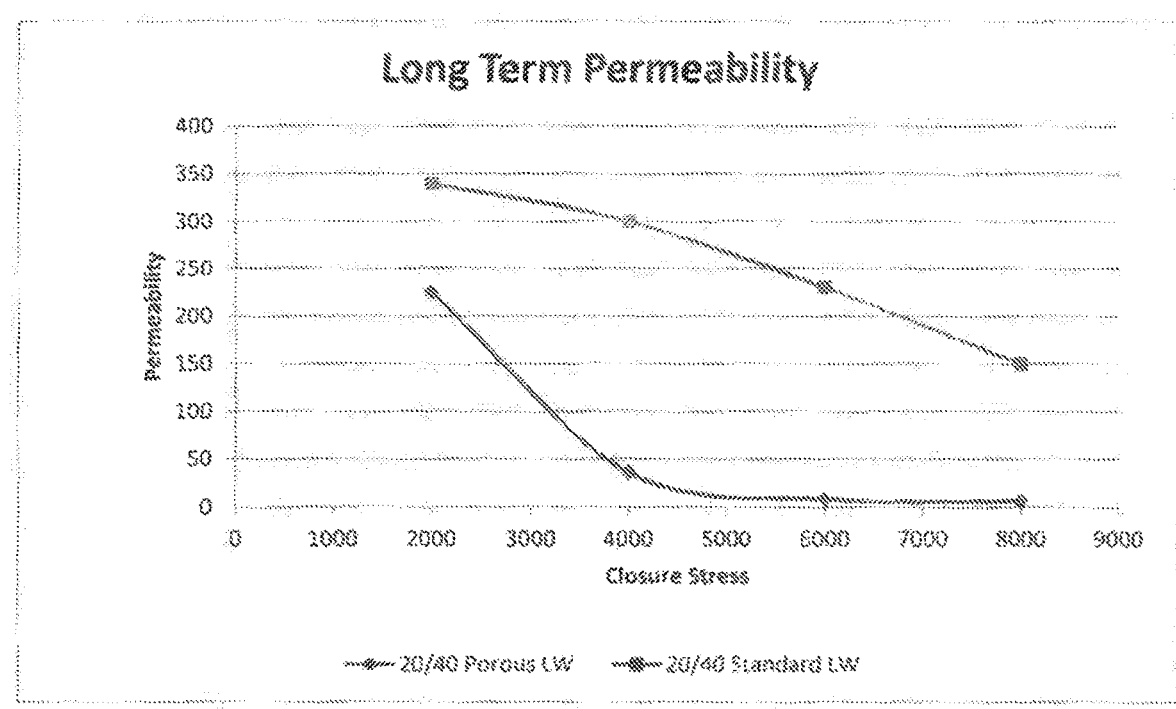
FIG. 2 is a graphical representation of the long term permeability of a standard non-porous light weight ceramic proppant and a light weight porous ceramic proppant (at 25% porosity).

FIG. 1 is a graphical comparison of the permeability of light weight ceramic proppant, intermediate density ceramic proppant, and high density ceramic proppant. As shown in FIG. 1, a high density ceramic proppant has a higher permeability than an intermediate density ceramic proppant which in turn has a higher permeability than a light weight ceramic proppant. This variability results from the crystalline structure differences arising from the difference in composition of the starting raw materials. FIG. 2 is a graphical representation of the long term permeability of a standard non-porous light weight ceramic proppant and a light weight porous ceramic proppant (at 25% porosity). Standard ceramic proppant are generally manufactured so as to eliminate as much porosity as is practically possible in the individual particulates in order to maximize the inherent strength of the particulates. This is consistent with the nature of ceramic bodies in that they tend to fail as a function of the size of the largest internal flaw and in this context an internal open pore space is a flaw. Consequently, in a general sense, the lower the internal porosity with small pore sizes, the stronger the ceramic body. Conversely, in a general sense, the greater the overall amount of internal porosity and large pore size of a ceramic particulate the weaker will be its inherent strength. Thus, the conductivity of a light weight ceramic proppant in which there is 10% porosity in the particulate will be lower than the conductivity of a lightweight ceramic proppant having 5% porosity which in turn will be lower than a non-porous light weight ceramic proppant.

Further, the comparison shown in FIG. 1 for non-porous ceramic proppant can be duplicated for porous ceramic proppant. Specifically, a high density porous ceramic proppant that has a porosity of the particulate of 12% will have a higher permeability than an intermediate density ceramic proppant with 12% particulate porosity, which in turn will have a higher permeability than a light weight ceramic proppant with 12% particulate porosity.

According to several exemplary embodiments, at least a portion of the proppant particulates of the proppant composition are coated with a resin material. According to several exemplary embodiments, at least about 50%, at least about 75%, at least about 85%, at least about 90%, at least about 95%, or least about 99% of the proppant particulates in the proppant composition are coated with the resin material. One or more of the nutrient containing proppant particulates in the proppant composition can be coated with the resin material. In one or more exemplary embodiments, all of the proppant particulates in the proppant composition can be coated with the resin material.

According to several exemplary embodiments, at least a portion of the surface area of each of the coated proppant particulates is covered with the resin material. According to several exemplary embodiments, at least about 10%, at least about 25%, at least about 50%, at least about 75%, at least about 90%, at least about 95%, or at least about 99% of the surface area of the coated proppant particulates is covered with the resin material. According to several exemplary embodiments, about 40% to about 99.9%, about 85% to about 99.99%, or about 98% to about 100% of the surface area of the coated proppant particulates is covered with the resin material. According to several exemplary embodiments, the entire surface area of the coated proppant particulates is covered with the resin material. For example, the coated proppant particulates can be encapsulated with the resin material.

According to several exemplary embodiments, the resin material is present on the resin coated proppant particulates in any suitable amount. According to several exemplary embodiments, the resin coated proppant particulates contain at least about 0.1 wt % resin, at least about 0.5 wt % resin, at least about 1 wt % resin, at least about 2 wt % resin, at least about 4 wt % resin, at least about 6 wt % resin, at least about 10 wt % resin, or at least about 20 wt % resin, based on the total weight of the resin coated proppant particulates. According to several exemplary embodiments, the resin coated proppant particulates contain about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin, based on the total weight of the resin coated proppant particulates.

According to several exemplary embodiments, the resin material includes any suitable resin. For example, the resin material can include a phenolic resin, such as a phenol-formaldehyde resin. According to several exemplary embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

According to several exemplary embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

According to several exemplary embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

According to several exemplary embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

According to several exemplary embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

According to several exemplary embodiments, the phenol-formaldehyde resin has a polydispersity index from a low of about 1, about 1.75, or about 2.5 to a high of about 2.75, about 3.5, or about 4.5. For example, the phenol-formaldehyde resin can have a polydispersity index from about 1 to about 1.75, about 1.75 to about 2.5, about 2.5 to about 2.75, about 2.75 to about 3.25, about 3.25 to about 3.75, or about 3.75 to about 4.5. The phenol-formaldehyde resin can also have a polydispersity index of about 1 to about 1.5, about 1.5 to about 2.5, about 2.5 to about 3, about 3 to about 3.35, about 3.35 to about 3.9, or about 3.9 to about 4.5.

According to several exemplary embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

According to several exemplary embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

According to several exemplary embodiments of the present invention, the resin coating applied to the proppant particulates is an epoxy resin. According to such embodiments, the resin coating can include any suitable epoxy resin. For example, the epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

According to several exemplary embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

According to several exemplary embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating proppant particulates with resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

According to several exemplary embodiments of the present invention, a curing agent is applied to the resin-coated proppant particulates in order to accelerate the transition of the resin from a liquid to a solid state. Suitable curing agents include curing agents that will leave active amine or epoxy sites on the surface of the resin coating. Suitable curing agents will depend on the specific resin chemistry employed and can include amines, acids, acid anhydrides, and epoxies. In several exemplary embodiments of the present invention, a phenolic resin material is applied to the surface of the proppant particulates and cured with an amine curing agent in order to leave active amine sites on the resin coated surface of the proppant particulates. In several exemplary embodiments, the phenolic resin is cured with hexamethylenetetramine, also known as hexamine. An example of a commercially available hexamine is Hexion™; which is available from Momentive.

In one or more embodiments, the nutrient material can be coated onto the proppant particulates to provide the nutrient containing proppant particulates. The nutrient containing proppant particulates can be obtained by mixing, blending, or otherwise combining the nutrient with the resin material prior to and/or during coating of the resin material onto the proppant particulates. The nutrient containing proppant particulates can also be obtained by coating one or more proppant particulates with the nutrient material to provide one or more nutrient coated proppant particulates. The nutrient coated proppant particulates can then be coated with the resin material to provide the nutrient containing proppant particulates.

The nutrient containing proppant particulates can contain the nutrients discussed above in any suitable amounts. For example, the coated porous proppant particulates, uncoated porous proppant particulates, coated non-porous proppant particulates and/or uncoated non-porous proppant particulates can contain the nutrients in any suitable amounts. According to several exemplary embodiments, the nutrients can be present in amounts from about 0.01 wt %, about 0.05 wt %, about 0.1 wt %, about 0.2 wt %, about 0.5 wt %, about 1 wt %, about 2 wt %, or about 3 wt % to about 5 wt %, about 8 wt %, or about 10 wt % or more based on the total weight of the nutrient containing proppant particulates. For example, the nutrient containing proppant can have a nutrient concentration of about 0.2 wt % to about 12 wt %, about 0.7 wt % to about 10 wt %, about 1.5 wt % to about 9 wt %, or about 4 wt % to about 8 wt %.

According to several exemplary embodiments, the nutrient containing proppant particulate is a porous ceramic proppant that is infused with the one or more nutrients disclosed herein. According to several exemplary embodiments, the porous ceramic proppant acts as a carrier for the nutrients in a hydraulic fracturing operation. The nutrients can be homogeneously or at least substantially homogeneously distributed throughout the pores and/or interstitial spaces of the porous ceramic proppant. The nutrients can be infused into the pores and/or interstitial spaces of the porous ceramic proppant by means of or under the presence of microwave energy, such as in a microwave furnace.

According to several exemplary embodiments of the present invention, in order to add porous, nutrient-infused ceramic proppant to standard non-porous ceramic proppant in a hydraulic fracture in a way that does not impair the permeability or conductivity of the standard non-porous ceramic proppant alone, requires the use of a combination of different types of ceramic proppant for the standard non-porous and porous portions of the total ceramic proppant mass utilized in the fracturing operation. For instance, according to several exemplary embodiments of the present invention, if the standard non-porous particulate selected is a light weight ceramic proppant, the porous ceramic particulate can be either an intermediate density ceramic proppant or a high density ceramic proppant. Also, according to several exemplary embodiments of the present invention, if the standard non-porous particulate selected is an intermediate density proppant, the porous ceramic particulate can be a high density ceramic proppant.

For example, the fraction of intermediate density porous ceramic proppant to be added to a standard non-porous lightweight ceramic proppant will dictate the maximum porosity that the intermediate density porous ceramic can have and not negatively impact permeability. In this example, if a 10% fraction of intermediate density porous proppant is to be added to a standard light weight ceramic proppant then the maximum porosity of the intermediate density porous proppant can be 12% in order to not reduce the permeability of the proppant as compared to the permeability of the standard light weight ceramic proppant alone whereas adding a 10% fraction of an intermediate density porous proppant having 20% porosity can be detrimental to proppant permeability.

According to several exemplary embodiments of the present invention, the porous, nutrient-infused ceramic proppant can have a similar alumina content as the standard non-porous ceramic proppant and can be added to the standard non-porous ceramic proppant in a hydraulic fracture in a way that does not impair the permeability or conductivity of the standard non-porous ceramic proppant alone. According to such embodiments, the porous and non-porous proppant are processed in different ways such that the mechanical properties of the tracer containing porous ceramic proppant is approximately the same as or better that the mechanical properties of the standard non-porous ceramic proppant.

According to several exemplary embodiments, the nutrient containing coated porous ceramic proppant can be prepared according to a two-step process. In the first step, the nutrient is infused into the porous ceramic proppant to produce an infused porous ceramic proppant. In the second step, the infused porous ceramic proppant is coated with a semi-permeable substantially non-degradable polymer. In several exemplary embodiments, the nutrient can be infused into the porous ceramic proppant by vacuum infusion. In other exemplary embodiments, the nutrient can be infused into the porous ceramic proppant using a thermal infusion process whereby the porous ceramic proppant is heated and wetted with a solution containing the nutrient. As the porous ceramic proppant cools, capillary action causes the nutrient to infuse into the porous ceramic proppant.

According to several exemplary embodiments, the nutrient containing coated porous ceramic proppant can be prepared according to a one step process. According to the one step process, the porous ceramic proppant is infused with the nutrient using the thermal infusion process described above and coated with a semi-permeable substantially non-degradable polymer before the resultant heat from the thermal infusion process dissipates.

A ceramic proppant composition containing a mixture of porous ceramic proppant and non-porous ceramic proppant can have a conductivity that is at least about 10%, at least about 20%, at least about 30%, at least about 40%, at least about 50%, at least about 60%, at least about 70%, at least about 80%, at least about 90%, at least about 95%, or at least about 99% of the conductivity of the non-porous ceramic proppant. For example, the ceramic proppant composition containing a mixture of porous ceramic proppant and non-porous ceramic proppant can have a conductivity from about 25% to about 125%, about 55% to about 115%, about 65% to about 112%, about 75% to about 108%, about 85% to about 105%, about 95% to about 105%, or about 99.99% to about 102% of the conductivity of the non-porous ceramic proppant.

According to several exemplary embodiments, when the well is placed on production following the completion of the hydraulic fracturing operations, the infused nutrient will elute from the porous ceramic grains of the porous proppant and/or from the coating of the coated proppant and will partition into one or both of the produced hydrocarbons and water. In order to accomplish this, and according to several exemplary embodiments, the nutrient separates from the nutrient containing proppant after the nutrient containing proppant is injected into the fracture. In several exemplary embodiments, separation of the nutrient from the nutrient containing proppant can be accomplished by the nutrient leaching, eluting, diffusing, bleeding, discharging, draining, seeping, or leaking out of the porous proppant and/or the coated proppant, or any combination thereof. Further, this leaching, eluting, diffusing, bleeding, discharging, draining, seeping, or leaking out of the porous proppant and/or the coated proppant, or any combination thereof can be further controlled by a permeable, semi-permeable, and/or degradable coating. According to several exemplary embodiments, the porous ceramic proppant infused with a nutrient are coated with a polymeric material that forms a semi-permeable polymeric coating that is substantially non-degradable in the presence of the well fluids but permits the nutrient to leach, elute, diffuse, bleed, discharge, desorb, dissolve, drain, seep, and leak through the polymeric coating so as to release the nutrient into the fracture or well area. According to several exemplary embodiments, the coated, nutrient containing proppant is coated with a polymeric material that forms a semi-permeable polymeric coating that is substantially non-degradable in the presence of the well fluids but permits the nutrient to leach, elute, diffuse, bleed, discharge, desorb, dissolve, drain, seep, and leak through the polymeric coating so as to release the tracer into the fracture or well area. The amount and molecular weight of the semi-permeable substantially non-degradable polymeric coating can be varied to provide for longer or shorter release times for tailored release of the nutrients. According to several exemplary embodiments, the porous proppant and the coated, nutrient containing proppant are coated with a semi-permeable substantially non-degradable polymer such as phenol formaldehyde, polyurethane, cellulose ester, polyamides, vinyl esters, epoxies, or combinations thereof.

The nutrient contained in the coatings of the coated proppant and/or contained in the infused coated porous proppant can leach, elute, diffuse, bleed, discharge, desorb, dissolve, drain, seep, or leak from the nutrient containing proppant once the nutrient containing proppant in the subterranean fracture is in contact with an aqueous and/or hydrocarbon solution. According to such embodiments, the infused coated porous ceramic proppant and/or nutrient containing coated proppant is placed in a fracture in a subterranean formation and once hydrocarbon production begins, the presence of the hydrocarbons causes leaching, elution, diffusion, bleeding, discharging, desorbing, dissolving, draining, seeping, or leaking of the nutrient contained in a hydrocarbon-soluble coating from the proppant. After a certain period of time, when water production begins, then the nutrient contained in the water-soluble coating begins to leach, elute, diffuse, bleed, discharge, desorb, dissolve, drain, seep, or leak from the proppant.

According to several exemplary embodiments of the present invention, the nutrient containing proppant particulates include a degradable coating. Specifically, as the coating degrades, the nutrient contained within the coating, under the coating, and/or within pores of the proppant particulates will be released into the fracture fluid. The amount and molecular weight of the degradable coating can be varied to provide for longer or shorter degrade times and tailored release of the nutrient. According to several exemplary embodiments, the nutrient is released from the nutrient containing proppant for a period of up to about one year, up to about five years, or up to about ten years after the nutrient containing proppant are placed in a fracture in a subterranean formation.

According to certain embodiments, the degradable coating can include one or more of water-soluble polymers and cross-linkable water-soluble polymers. Suitable water-soluble polymers and cross-linkable water-soluble polymers are disclosed in U.S. Pat. No. 6,279,656, the entire disclosure of which is incorporated herein by reference. According to several exemplary embodiments in which the degradable coating includes one or more of water-soluble polymers and cross-linkable water-soluble polymers, the solubility parameters of such polymers can be controlled to adjust the timing of the solubility or degradation of the coating. Such parameters can include molecular weight, the hydrophilic/lipophilic balance of the polymers, and the extent of cross-linking of the polymers. According to several exemplary embodiments, the degradable coating includes a degradable polymer such as polylactic acid, cellulose acetate, methyl cellulose or combinations thereof and will degrade inside the hydraulic fracture to allow for the release of the nutrient at different time intervals. The degradable coating coatings can include self-polishing coatings. The self-polishing coatings can include self-polishing copolymers having chemical bonds that are gradually hydrolyzed by water, such as produced water, seawater, and/or saltwater. The self-polishing coating can release the nutrients gradually, over time, due to the nature of the degradation of the coating from its outermost surface towards its innermost surface, the degradation caused by the coating being gradually hydrolyzed by water.

The nutrient can leach, elute, diffuse, bleed, discharge, desorb, dissolve, drain, seep, or leak from the nutrient containing proppant particulates at any suitable rate. According to one or more exemplary embodiments, the nutrient can leach, elute, diffuse, bleed, discharge, desorb, dissolve, drain, seep, or leak from the nutrient containing proppant particulates at a rate of at least about 0.1 parts-per-million nutrient per grams of proppant per day (ppm/(gram*day)), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 4 ppm/(gram*day), at least about 6 ppm/(gram*day), or at least about 8 ppm/(gram*day) for at least about 2 months, at least about 6 months, at least about 9 months, at least about 1 year, or at least about 2 years. For example, nutrients can elute from the nutrient containing proppant particulates at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), or about 75 ppm/(gram*day) for at least about 2 months, at least about 6 months, at least about 9 months, at least about 1 year, or at least about 2 years.

According to several exemplary embodiments, one or more of the proppant particulates disclosed herein can be encapsulated by a degradable shell as disclosed in U.S. patent application Ser. No. 14/857,564, the entire disclosure of which is incorporated herein by reference. The degradable shell can be or include any material suitable to prevent or eliminate separation or release of the nutrients from the encapsulated proppant until the degradable shell degrades or breaks down. For example, the degradable shell can be impermeable or substantially impermeable to fracturing fluids, reservoir fluids, or the like until the degradable shell degrades to a point that it becomes permeable to the surrounding fluid(s). Once the degradable shell becomes fluid permeable, the nutrients can separate or elute from the encapsulated proppant.

The degradable shell can be or include any water soluble and/or hydrocarbon soluble material. In one or more exemplary embodiments, the degradable shell can be or include the encapsulation materials and/or sustained release compositions described in any one of U.S. Pre-Grant Publication Nos. 2003/0147821, 2005/0002996 and 2005/0129759, each incorporated by reference herein in its entirety. In one or more exemplary embodiments, the degradable shell can be or include fatty alcohols that include, but are not limited to, behenyl alcohol, caprylic alcohol, cetyl alcohol, cetaryl alcohol, decyl alcohol, lauryl alcohol, isocetyl alcohol, myristyl alcohol, oleyl alcohol, stearyl alcohol, tallow alcohol, steareth-2, ceteth-1, ceteareth-3, and laureth-2. The degradable shell can also be or include $C_8$-$C_{20}$ fatty acids that include, but are not limited to, stearic acid, capric acid, behenic acid, caprylic acid, lauric acid, myristic acid, tallow acid, oleic acid, palmitic acid, and isostearic acid. The degradable shell can also be or include sorbitan derivatives that include, but are not limited to, PEG-10 sorbitan laurate, PEG-20 sorbitan isostearate, PEG-3 sorbitan oleate, polysorbate 40, sorbitan stearate, and sorbitan palmitate. The degradable shell can also be or include one or more waxes that include, but are not limited to, mink wax, montan wax, carnauba wax, and candelilla wax, and synthetic waxes, such as silicone waxes. In one or more exemplary embodiments, the degradable shell can be selected from polyoxymethylene urea (PMU), methoxymethyl methylol melamine (MMM), polysaccharides, collagens, gelatins, alginates, guar, guar gum, gum Arabic, and agar and any combination or mixture thereof. The degradable shell can also be or include any suitable thermoplastic material. In one or more exemplary embodiments, the degradable shell can be selected from polyvinyl alcohol, poly(acrylates and methacrylates), polylactic acid, polyamides, polyethylene, polypropylene, polystyrene, water-soluble polymers, and cross-linkable water-soluble polymers and any combination thereof.

In one or more exemplary embodiments, the degradable shell can be a thermoplastic material that degrades at any suitable time and temperature. For example, the thermoplastic material can degrade at temperatures of at least about 5° C., at least about 10° C., at least about 20° C., at least about 30° C., at least about 50° C., at least about 70° C., or at least about 90° C. The thermoplastic material can also degrade at temperatures of less than 100° C., less than 95° C., less than 90° C., less than 80° C., or less than 70° C. The thermoplastic material can also degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more. In one or more exemplary embodiments, the thermoplastic material can degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more within a time period ranging from about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more.

According to one or more exemplary embodiments, the degradable shell can degrade in any suitable manner. For example, the degradable shell can degrade from the outside-in, such that the outer surface of the degradable shell degrades first, resulting in controlled release of the nutrients. The degradable shell can also be a self-polishing coating as disclosed herein.

The degradable shell 302 can prevent the leaching, elution, diffusion, bleeding, discharging, desorption, dissolution, draining, seeping, or leaking of the nutrients from the non-degraded encapsulated proppant, or encapsulated proppant particulates. According to one or more exemplary embodiments, the nutrients can leach, elute, diffuse, bleed, discharge, desorb, dissolve, drain, seep, or leak from the encapsulated proppant particulates at a rate of less than 10 ppm/(gram*day), less than 5 ppm/(gram*day), less than 2 ppm/(gram*day), less than 1 ppm/(gram*day), less than 0.5 ppm/(gram*day), less than 0.1 ppm/(gram*day), or less than 0.05 ppm/(gram*day) for at least about 1 hour, at least about 2 hours, at least about 6 hours, at least about 12 hours, at least about 1 day, or at least about 2 days after being admixed with a hydraulic fracturing fluid. According to one or more exemplary embodiments, the nutrients can leach, elute, diffuse, bleed, discharge, desorb, dissolve, drain, seep, or leak from the encapsulated proppant particulates at a rate of less than 10 ppm/(gram*day), less than 5 ppm/(gram*day), less than 2 ppm/(gram*day), less than 1 ppm/(gram*day), less than 0.5 ppm/(gram*day), less than 0.1 ppm/(gram*day), or less than 0.05 ppm/(gram*day) for at least about 1 hour, at least about 2 hours, at least about 6 hours, at least about 12 hours, at least about 1 day, or at least about 2 days after contacting a subterranean formation. For example, the degradable shell can limit the amount of leaching, elution, diffusion, bleeding, discharging, desorption, dissolution, draining, seeping, or leaking of the nutrients from the encapsulated proppant particulates to less than 10 ppm/gram, less than less than 5 ppm/gram, less than 1 ppm/gram, less than 0.5 ppm/gram, less than 0.1 ppm/gram, or less than less than 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more after being admixed with a hydraulic fracturing fluid and/or a gravel-pack fluid. For example, the degradable shell can limit the amount of leaching, elution, diffusion, bleeding, discharging, desorption, dissolution, draining, seeping, or leaking of the nutrients from the encapsulated proppant particulates to less than 10 ppm/gram, less than less than 5 ppm/gram, less than 1 ppm/gram, less than 0.5 ppm/gram, less than 0.1 ppm/gram, or less than less than 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more after contacting a subterranean formation. In one or more exemplary embodiments, the degradable shell can prevent any leaching, elution, diffusion, bleeding, discharging, desorption, dissolution, draining, seeping, or leaking of the nutrients from the encapsulated proppant particulates after being admixed with a hydraulic fracturing fluid and/or prior to contacting a subterranean formation.

According to several exemplary embodiments, one or more of the proppant particulates disclosed herein contain one or more of the foreign microorganisms disclosed herein. In one or more exemplary embodiments, the foreign microorganisms can be coated on and/or infused into the proppant particulate in a suitable manner. For example, the foreign microorganisms can be coated on and/or infused into proppant particulate in a manner the same as or similar to that of the nutrient containing proppant particulate as disclosed herein.

The proppant particulates can be mixed with an aqueous solution in any suitable amounts to provide a fracturing fluid. The nutrient containing proppant particulate and/or foreign microorganism containing proppant particulate can be present in amounts of at least about 0.01 wt %, at least about 0.05 wt %, at least about 0.1 wt %, at least about 0.5 wt %, at least about 1 wt %, at least about 2 wt %, at least about 5 wt %, or at least about 10 wt % or more based on the total weight of the fracturing fluid. The nutrient containing proppant particulate and/or foreign microorganism containing proppant particulate can be present in amounts from about 1 wt %, about 3 wt %, about 5 wt %, or about 7 wt % to about 9 wt %, about 12 wt %, about 14 wt %, about 16 wt %, about 18 wt % or more based on the total weight of the fracturing fluid.

In addition to the nutrient containing proppant particulates and/or foreign microorganism containing proppant particulates described above, the fracturing fluid can also contain water, the one or more nutrients described above, the one or more foreign microorganisms described above, one or more tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, demulsifiers, defoamers, gel breakers, salt inhibitors, oxygen scavengers, iron sulfide scavengers, iron scavengers, clay stabilizers, enzymes, flocculants, naphthenate inhibitors, carboxylate inhibitors, nanoparticle dispersions, surfactants, combinations thereof, or any other oilfield chemical that may be deemed helpful in the hydraulic fracturing process. The fracturing fluid can be an aqueous solution containing water in any suitable amounts. The water can be present in amounts from about 20 wt %, about 35 wt %, about 45 wt %, about 55 wt %, about 65 wt %, about 75 wt %, or about 85 wt % to about 90 wt %, about 92 wt %, about 94 wt %, about 96 wt %, about 98 wt % or more based on the total weight of the fracturing fluid. The water used to form the aqueous solution can be fresh water, saltwater, brine, or any other aqueous liquid.

In one or more exemplary embodiments, injecting a fracturing fluid including the nutrient containing proppant particulates can increase an effective propped length of a fracture by at least about 1%, at least about 5%, at least about 10%, or at least about 20%. As used herein, the term "effective propped length," refers to a length of the fracture that has a conductivity greater than that of the formation adjacent to the fracture.

Exemplary embodiments of the present disclosure further relate to any one or more of the following paragraphs:

1. A proppant composition for use in hydraulic fracturing, the composition comprising: a plurality of particulates; and at least one particulate of the plurality of particulates containing at least one nutrient, wherein the at least one nutrient separates from the at least one particulate located inside a fracture of a subterranean formation after a period of time.

2. The composition according to paragraph 1, wherein the at least one particulate has a long term permeability measured in accordance with ISO 13503-5 at 7,500 psi of at least about 10 Darcies.

3. The composition according to paragraphs 1 or 2, wherein the plurality of particulates comprises non-porous particulates and porous particulates.

4. The composition according to paragraph 3, wherein the plurality of particulates has a permeability that is at least equal to the permeability of the non-porous particulates.

5. The composition according to paragraph 4, wherein the plurality of particulates has a conductivity that is at least about 70% of the conductivity of the non-porous particulates.

6. The composition according to any one of paragraphs 3 to 5, wherein the porous particulates contain the nutrient.

7. The composition according to any one of paragraphs 3 to 6, wherein the non-porous particulates contain the nutrient.

8. The composition according to any one of paragraphs 3 to 7, wherein at least one of the non-porous particulates and the porous particulates have an apparent specific gravity that is less than 3.1 g/cm$^3$.

9. The composition according to any one of paragraphs 3 to 8, wherein at least one of the non-porous particulates and the porous particulates have an apparent specific gravity of from 3.1 to 3.4 g/cm3.

10. The composition according to any one of paragraphs 3 to 9, wherein at least one of the non-porous particulates and the porous particulates has an apparent specific gravity that is greater than 3.4 g/cm$^3$.

11. The composition according to any one of paragraphs 3 to 10, wherein the non-porous particulate is selected from the group consisting of light weight ceramic non-porous proppant, intermediate density ceramic non-porous proppant and high density porous ceramic proppant.

12. The composition according to any one of paragraphs 3 to 11, wherein the porous particulate is selected from the group consisting of light weight porous ceramic proppant, intermediate density porous ceramic proppant and high density porous ceramic proppant.

13. The composition according to any one of paragraphs 1 to 12, wherein the nutrient is selected from the group consisting of proteins, carbohydrates, and lipids and any combination thereof.

14. The composition according to any one of paragraphs 1 to 13, wherein the nutrient is selected from the group consisting of monocalcium phosphate, dicalcium phosphate, phosphoric acid, ammonium chloride, potassium nitrate, ammonium nitrate, urea, and nitratine and any combination thereof.

15. The composition according to any one of paragraphs 1 to 14, wherein the nutrient supports propagation and/or colonization of a native microorganism inside the fracture of the subterranean formation.

16. The composition according to any one of paragraphs 3 to 15, wherein the proppant composition further comprises a degradable coating or a non-degradable coating, and wherein the degradable coating degrades inside the fracture.

17. The composition according to paragraph 16, wherein the degradable coating is selected from the group consisting of polylactic acid, water-soluble polymers, and cross-linkable water-soluble polymers and any combination thereof.

18. The composition according to paragraphs 16 or 17, wherein the degradable coating is a self-polishing coating.

19. The composition according to any one of paragraphs 16 to 18, wherein the non-degradable coating is selected from the group consisting of phenol formaldehyde, polyurethane, cellulose ester, polyamides, vinyl esters, and epoxies, and any combination thereof.

20. The composition according to any one of paragraphs 16 to 19, wherein the nutrient is contained in the non-degradable coating or the degradable coating.

21. The composition according to any one of paragraphs 16 to 18, wherein the nutrient is disposed between the at least one particulate and the non-degradable coating or the degradable coating.

22. The composition according to paragraph 15, wherein the native microorganism alters the wettability of the proppant composition in a hydraulic fracture environment.

23. The composition according to paragraph 15, wherein the native microorganism removes gel from the proppant composition and/or the fracture of the subterranean.

24. A method of hydraulic fracturing a subterranean formation, comprising: injecting a hydraulic fluid into a subterranean formation at a rate and pressure sufficient to open a fracture therein; and injecting a fluid containing a proppant composition into the fracture, the proppant composition comprising: a plurality of particulates; and at least one particulate of the plurality of proppant particulates containing at least one nutrient, the at least one particulate having a long term permeability measured in accordance with ISO 13503-5 at 7,500 psi of at least about 10 Darcies; eluting the nutrient from the at least one particulate located inside the fracture over a period of time.

25. The method according to paragraph 24, wherein the nutrient is selected from the group consisting of proteins, carbohydrates, and lipids and any combination thereof.

26. The method according to paragraphs 24 or 25, wherein the nutrient is selected from the group consisting of monocalcium phosphate, dicalcium phosphate, phosphoric acid, ammonium chloride, potassium nitrate, ammonium nitrate, urea, and nitratine and any combination thereof.

27. The method according to any one of paragraphs 24 to 26, further comprising utilizing the nutrient to support propagation and/or colonization of a native microorganism inside the fracture of the subterranean formation.

28. The method according to paragraph 27, wherein the native microorganism alters the wettability of the proppant composition in a hydraulic fracture environment.

29. The method according to paragraph 27, wherein the native microorganism removes gel from the proppant composition and/or the fracture of the subterranean.

30. A hydraulic fracturing composition, comprising: an aqueous solution; a plurality of particulates; and at least one particulate of the plurality of particulates containing at least one nutrient, wherein the at least one nutrient separates from the at least one particulate located inside a fracture of a subterranean formation after a period of time.

31. The composition according to paragraph 30, wherein the nutrient is selected from the group consisting of proteins, carbohydrates, and lipids and any combination thereof.

32. The composition according to paragraphs 30 or 31, wherein the nutrient is selected from the group consisting of monocalcium phosphate, dicalcium phosphate, phosphoric acid, ammonium chloride, potassium nitrate, ammonium nitrate, urea, and nitratine and any combination thereof.

33. The composition according to any one of paragraphs 30 to 32, wherein the nutrient supports propagation and/or colonization of a native microorganism inside the fracture of the subterranean formation.

34. The composition according to any one of paragraphs 30 to 33, wherein the at least one particulate further comprises a degradable coating or a non-degradable coating, and wherein the degradable coating degrades inside the fracture.

35. The composition according to paragraph 34, wherein the degradable coating is selected from the group consisting of polylactic acid, water-soluble polymers, and cross-linkable water-soluble polymers and any combination thereof.

36. The composition according to paragraphs 34 or 35, wherein the degradable coating is a self-polishing coating.

37. The composition according to any one of paragraphs 34 to 36, wherein the non-degradable coating is selected from the group consisting of phenol formaldehyde, polyurethane, cellulose ester, polyamides, vinyl esters, and epoxies, and any combination thereof.

38. The composition according to any one of paragraphs 34 to 37, wherein the nutrient is contained in the non-degradable coating or the degradable coating.

39. The composition according to any one of paragraphs 34 to 38, wherein the nutrient is disposed between the at least one particulate and the non-degradable coating or the degradable coating.

40. The composition according to paragraph 30, wherein the aqueous solution also comprises the nutrient.

41. The composition according to paragraphs 30 or 40, wherein the aqueous solution comprises a foreign microorganism.

While the present invention has been described in terms of several exemplary embodiments, those of ordinary skill in the art will recognize that the invention can be practiced with modification within the spirit and scope of the appended claims.

The present disclosure has been described relative to a several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A hydraulic fracturing composition, comprising:
an aqueous solution; and
a plurality of particulates comprising from 0.1 wt % to 10 wt % of a nutrient, the plurality of particulates having a long term permeability measured in accordance with ISO 13503-5 at 7,500 psi of about 10 Darcies or greater, wherein the particulates have an internal interconnected porosity of from about 5% to about 35%.

2. The composition of claim 1, wherein the nutrient is selected from the group consisting of proteins, carbohydrates, lipids, monocalcium phosphate, dicalcium phosphate, phosphoric acid, ammonium chloride, potassium nitrate, ammonium nitrate, urea, and nitratine, and any combination thereof.

3. The composition of claim 2, wherein the nutrient is selected from the group consisting of ammonium chloride, potassium nitrate, ammonium nitrate, urea, and nitratine, and any combination thereof.

4. The composition of claim 1, wherein the nutrient is selected from the group consisting of glycolipids, lipopeptides, phospholipids, fatty acids, neutral lipids, vitamin A, vitamin D, vitamin E, vitamin K, monoglycerides, diglycerides, and triglycerides, and any combination thereof.

5. The composition of claim 1, wherein the nutrient is selected from the group consisting of monocalcium phosphate, dicalcium phosphate, and phosphoric acid, and any combination thereof.

6. The composition of claim 1, wherein the at least one particulate further comprises a coating selected from the group consisting of polylactic acid, water-soluble polymers, and cross-linkable water-soluble polymers and any combination thereof.

7. The composition of claim 1, wherein the at least one particulate further comprises a coating selected from the group consisting of phenol formaldehyde, polyurethane, cellulose ester, polyamides, vinyl esters, and epoxies, and any combination thereof.

8. The composition of claim 7, wherein the coating is a phenol formaldehyde.

9. The composition of claim 1, wherein the particulates comprise from about 60 wt % to about 95 wt % alumina.

10. The composition of claim 1, further comprising nonporous ceramic proppant.

* * * * *